No. 818,528. PATENTED APR. 24, 1906.
R. D. DRUMMOND.
CHEESE CUTTER.
APPLICATION FILED JUNE 5, 1905.
2 SHEETS—SHEET 1.
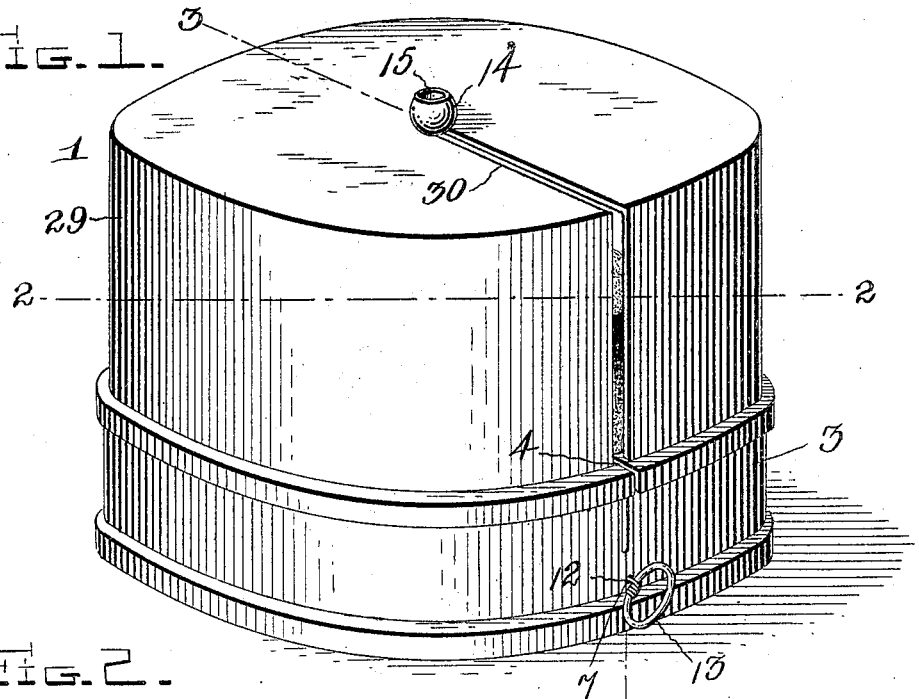
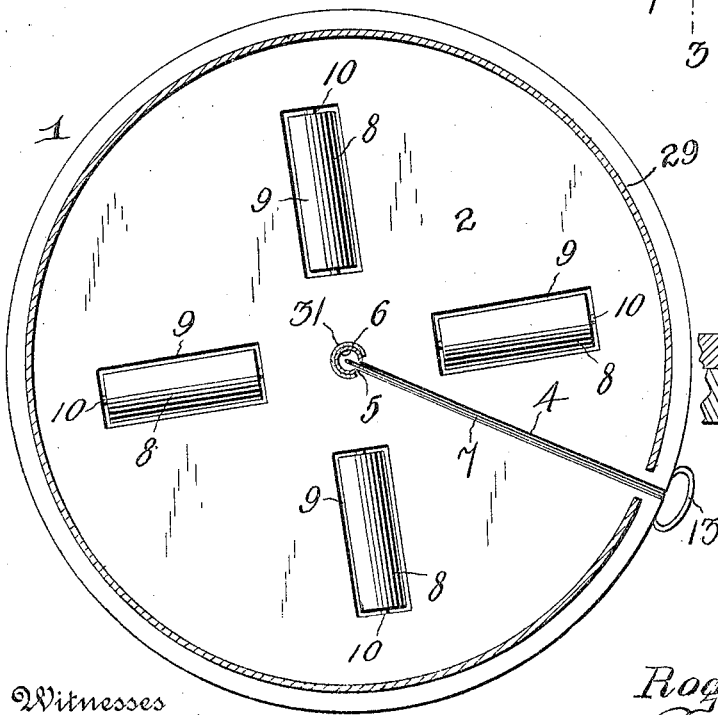
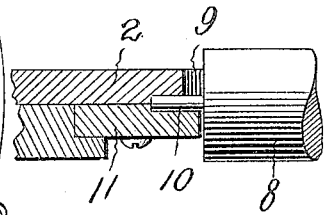
Witnesses
Jas. A. Koehl.
C. H. Griesbauer.
Inventor
Rogers D. Drummond
by Benj. G. Cowl
Attorney No. 818,528.   PATENTED APR. 24, 1906.
R. D. DRUMMOND.
CHEESE CUTTER.
APPLICATION FILED JUNE 5, 1905.
2 SHEETS—SHEET 2.
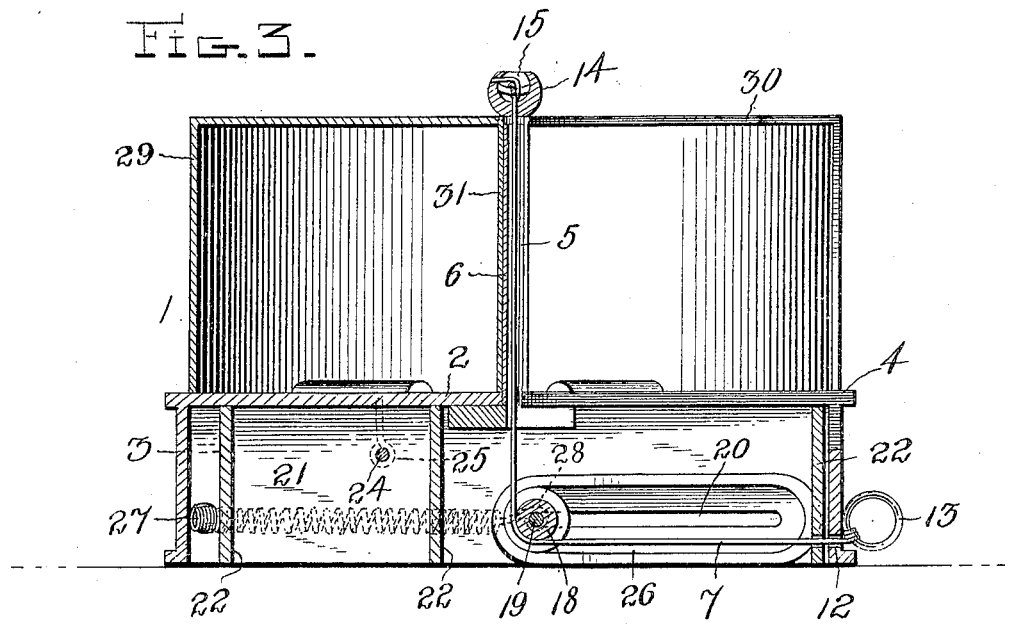
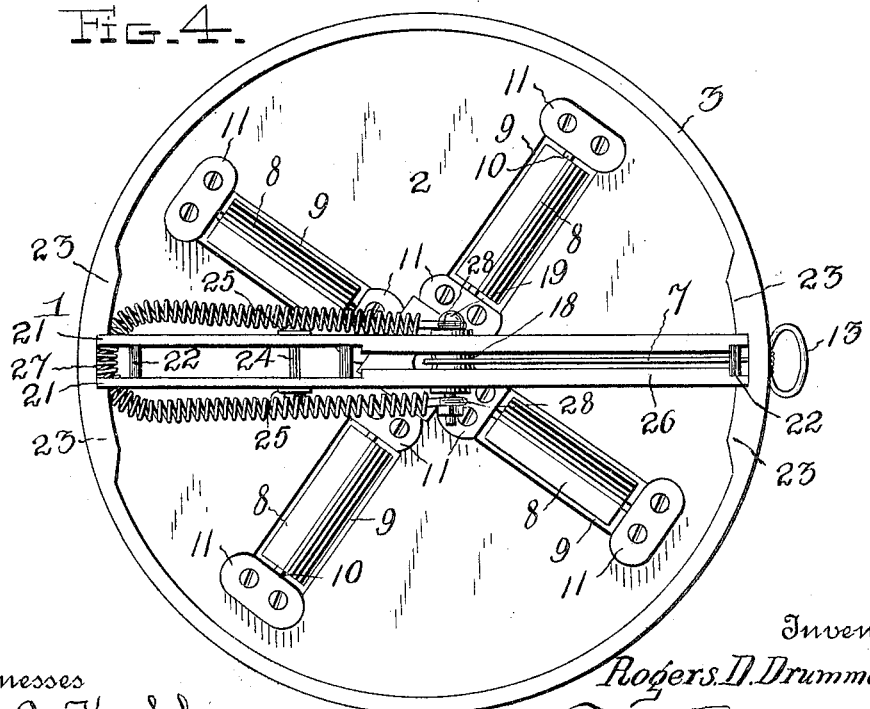
Witnesses
Jas. A. Koehl.
C. H. Griesbauer.
Inventor
Rogers D. Drummond.
by Benj. T. Cowl
Attorney

UNITED STATES PATENT OFFICE.

ROGERS DYKES DRUMMOND, OF POUGHKEEPSIE, NEW YORK.

CHEESE-CUTTER.

No. 818,528.        Specification of Letters Patent.        Patented April 24, 1906.

Application filed June 5, 1905. Serial No. 263,793.

*To all whom it may concern:*

Be it known that I, ROGERS DYKES DRUMMOND, a citizen of the United States, residing at Poughkeepsie, in the county of Dutchess and State of New York, have invented new and useful Improvements in Cheese-Cutters, of which the following is a specification.

My invention relates to improvements in cutters for cheese and the like.

The object of the invention is to provide a simple, durable, and comparatively inexpensive machine of this character by means of which cheese may be quickly and easily cut with little or no waste.

With the above and other objects in view the invention consists of certain novel features of construction, combination, and arrangement of devices herein shown and described.

In the accompanying drawings, Figure 1 is a perspective view of my improved cheese-cutting machine. Fig. 2 is a horizontal sectional view through the same, taken on the plane indicated by the line 2 2 in Fig. 1. Fig. 3 is a vertical transverse sectional view taken on the line 3 3 in Fig. 1. Fig. 4 is a plan view of the under side of the machine, and Fig. 5 is a detail view through one of the cheese-supporting rollers.

Referring to the drawings by numerals, 1 denotes my improved cheese-cutter, which comprises a base 2, preferably of circular form and supported by an annular side wall 3. In the base 2 is formed a radially-extending slot 4, which alines with a longitudinal slot 5, formed in a tubular upright 6, which is mounted centrally upon the base 2. The slots 4 and 5 are provided for the passage of a flexible wire or similar element 7, which is adapted to cut the block or cake of cheese, butter, or the like, which is supported upon the top of the base 2.

The cheese or the like may be mounted in any desired manner upon the base 2, so that it may be revolved to bring any portion of it above the slot 4; but I preferably provide a series of radially-disposed supporting-rollers 8, which are disposed in the slots 9 in the base 2. These rollers, as clearly shown in Fig. 5 of the drawings, have their trunnions 10 journaled in suitable bearings 11, provided upon the under side of the base 2.

The cutting-wire 7 has one of its ends attached to the inner face of the side wall 3 at a point beneath the outer end of the slot 4, and I preferably do this by passing said end of the wire through a guide-opening 12 and securing it to a ring 13, as shown. The opposite end of the cutting-wire 7 is attached to a hand-piece 14, preferably in the form of a ball or sphere formed with a centrally-disposed opening 15. The end of the wire is secured in this opening or recess in the ball by passing it through the ball, then around the piece of leather or the like, which is placed within the enlarged upper portion of such recess, and then passing said end again through the ball, so that the piece of leather will be wedged tightly in the contracted portion of said recess or opening, as clearly shown in Fig. 3 of the drawings.

In cutting the cheese the ball or hand-piece 14, which is normally seated upon the top of the tubular upright 6, is drawn upwardly and outwardly, so that the wire 7 moves outwardly through the slot 4 and the cheese above the same, and in order to guide the wire through said slot it is passed over a guide-pulley 18, which is slidably mounted beneath the base 2. This pulley turns freely upon a shaft or bolt 19, which is adapted to project through and slide in alining longitudinal slots 20, formed in two parallel bars 21, extending beneath the base 2 and mounted at their opposite ends upon the inner face of the side wall 3 at diametrically opposite points. These parallel bars 20 are connected and spaced apart by blocks 22, and they are preferably removably mounted by having their ends slidably engaged with guide ribs or cleats 23, formed or provided upon the side wall 3, as clearly shown in Fig. 4 of the drawings. The bars 21 are retained in position by passing a bolt 24 through them and through hooks or eyes 25, provided upon the under side of the base 2. Upon the inner opposing faces of the bars 21 are formed or provided longitudinally-disposed guide-recesses 26, in which the flanges of the pulley 18 slide, as clearly shown in Fig. 4 of the drawings. The pulley or wheel 18 is held normally at the inner end of its guide by a coiled spring 27, which is doubled upon itself and passed through recesses in one end of the bars 20, and which has hooks 28 at its ends, engaged with the opposite ends of the bolt or shaft 19.

In order to protect the cheese upon the base 2 and to guide the upper or free end of the cutting-wire 7, I preferably provide upon the top of the base 2 a removable cover 29, which is circular in form, so as to surround the block or cake of cheese. The top of said cover is formed with a radially-disposed slot-opening 30, which is considerably broader than the slot 4 in the base 2, so that it may be readily made to register with the slot 4. The wire 7 extends through a centrally-disposed opening in the top of the cover, and the latter has upon its under side a slotted tube 31, which is adapted to telescope the tubular upright 6, as clearly shown in Fig. 2 of the drawings.

The construction, operation, and advantages of the invention will be readily understood from the foregoing description, taken in connection with the accompanying drawings. I preferably cut the whole cheese horizontally in two half-sections and place one at a time in the device. It will be seen that when the whole or a portion of the cake or block of cheese is supported upon the rollers it may be readily revolved, so as to bring any desired point above the slot 4, and that when the cover is placed in position and the handpiece or ball 14 is pulled upwardly and outwardly the cutting-wire 7 will be drawn upon and moved outwardly through the said slot to cut the cheese, the pulley 18 and the slot 30 in the cover guiding said wire so that the latter makes a vertical cut. As soon as tension is removed from the ball 14 the coiled spring beneath the base will move the pulley 18 inwardly and return the wire to its normal position, as shown in Fig. 3 of the drawings. The machine may be constructed in various sizes, according to the size of the cheese to be placed therein, and of any desired material. The base may be constructed of either metal or wood, and when the latter is used I preferably provide blocks of metal beneath the base in order to give the same sufficient weight.

While I have shown and described the preferred embodiment of my invention, it will be understood that I do not wish to be limited to the precise construction herein set forth, since various changes in the form, proportion, and minor details of construction may be resorted to without departing from the spirit or sacrificing any of the advantages of the invention.

Having thus described my invention, what I claim as new, and desire to secure by Letters Patent, is—

1. A cutter of the character described, comprising a base, a centrally-disposed tubular upright thereon, said base and upright being formed with alining slots, and a flexible cutting element adapted to be moved through said slots, substantially as described.

2. A cutter of the character described, comprising a base, a centrally-disposed tubular upright thereon, said base and upright being formed with alining slots, a guide device slidable in said base and in alinement with its slot and a flexible cutting element passed over said guide and extending through said tubular upright and beneath the said base, substantially as described.

3. A cutter of the character described, comprising a base, a centrally-disposed tubular upright thereon, said base and upright being formed with alining slots, a spring-retracted guide and pulley slidably mounted in said base in alinement with its slot, a flexible cutting-wire passed over said pulley and extending through said tubular upright and beneath said base, substantially as described.

4. A cutter of the character described, comprising a base, a centrally-disposed tubular upright thereon, said base and upright being formed with alining slots, a guide roller or pulley slidably mounted in said base in alinement with its slot, a flexible cutting element passed around said pulley and having one of its ends extending through said tubular upright and its other end attached to the outer portion of said base, and a handpiece upon the free end of said cutting element, substantially as described.

5. A cutter of the character described, comprising a base, a centrally-disposed tubular upright thereon, said base and upright being formed with alining slots, rollers upon said base for supporting a piece of cheese or the like, a guide device in said base, a flexible cutting wire or element passed about said guide device and having one end attached to the outer portion of said base and its opposite end extending through said slotted upright, a handpiece upon the free end of said wire, and a movable cover upon said base formed with a slot or opening to clear and guide said wire.

6. A cutter of the character described, comprising a circular base having an annular side wall and formed with a radially-disposed slot, a tubular upright disposed centrally upon said base and formed with a longitudinal slot to aline with the slot in said base, radially-disposed rollers mounted in said base for supporting cheese or the like, a guide-frame removably mounted beneath said base, a guide-pulley slidably mounted in said frame, a spring for retracting said pulley, a flexible cutting-wire engaging said pulley having one end attached to the outer portion of said base adjacent to the slot in the latter and its opposite end extending through said tubular upright, and a handpiece upon the free end of said cutting-wire, substantially as described.

7. A cutter of the character described, comprising a circular base having an annular side wall and formed with a radially - disposed slot, a tubular upright disposed centrally upon said base and formed with a longitudinal slot to aline with the slot in said base, radially-disposed rollers mounted in said base for supporting cheese or the like, a guide-frame removably mounted beneath said base, a guide - pulley slidably mounted in said frame, a spring for retracting said pulley, a flexible cutting-wire engaging said pulley having one end attached to the outer portion of said base adjacent to the slot in the latter and its opposite end extending through said tubular upright, a handpiece upon the free end of said cutting-wire, a movable cover mounted upon the said base and formed with a radially-extending slot or opening in its top and a slotted tubular guide depending from the center of the under side of the top of said cover and adapted to telescope the tubular upright upon said base, substantially as described.

In testimony whereof I have signed my name to this specification in the presence of two subscribing witnesses.

ROGERS DYKES DRUMMOND.

Witnesses:
    T. H. LEE,
    IRVING W. TRAVER.